(12) United States Patent
Maxwell et al.

(10) Patent No.: US 12,066,254 B1
(45) Date of Patent: Aug. 20, 2024

(54) TWO-PHASE THERMAL PROTECTION OF THE HYPERSONIC LEADING EDGE

(71) Applicant: The Government of the United States of America, as represented by the Secretary of the Navy, Arlington, VA (US)

(72) Inventors: Jesse R. Maxwell, Silver Spring, MD (US); Robert W. Baldauff, Mechanicsville, MD (US); Triem T. Hoang, Clifton, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 15/997,465

(22) Filed: Jun. 4, 2018

Related U.S. Application Data (60) Provisional application No. 62/514,393, filed on Jun. 2, 2017.

(51) Int. Cl.
  *F28D 15/02* (2006.01)
  *F28D 15/04* (2006.01)
  *F28D 21/00* (2006.01)

(52) U.S. Cl.
  CPC ....... *F28D 15/0275* (2013.01); *F28D 15/025* (2013.01); *F28D 15/0266* (2013.01); *F28D 15/04* (2013.01); *F28D 2021/0021* (2013.01)

(58) Field of Classification Search
  CPC ............. F28D 15/0266; F28D 15/0275; F28D 15/025; F28D 15/04; F28D 2021/0021
  See application file for complete search history.

(56) References Cited

U.S. PATENT DOCUMENTS

| | | | | |
|---|---|---|---|---|
| 2,160,397 A | * | 5/1939 | Brammer ............... | B64D 15/06 244/134 B |
| 2,645,435 A | * | 7/1953 | Pouit ....................... | B64C 27/18 244/123.13 |
| 3,094,301 A | * | 6/1963 | Taylor ..................... | B64D 15/02 244/134 R |
| 3,321,154 A | * | 5/1967 | Downs ..................... | B64G 1/58 428/116 |
| 3,369,782 A | * | 2/1968 | Billig ..................... | B64D 13/006 244/117 A |

(Continued)

*Primary Examiner* — Ljiljana V. Ciric
(74) *Attorney, Agent, or Firm* — US Naval Research Laboratory; Nigel R. Fontenot (57) ABSTRACT

A method of thermally protecting a leading edge of a hypersonic system includes saturating an annular primary wick in contact with an evaporator and having a first pore size with a phase change material by means of an annularly-inward secondary wick having a second pore size and being coupled to a liquid line, the second pore size being larger than the first, where a first end of the secondary wick extends into a reservoir and a second end of the secondary wick extends into the evaporator, the second end of the secondary wick having a terminal end. The method includes terminating the liquid line inside of the evaporator, transferring thermal energy from the leading edge into the phase change material, raising the temperature of the phase change material to a phase-change temperature, changing phase of the phase change material, and carrying away heat from the leading edge.

8 Claims, 11 Drawing Sheets

(56) References Cited

U.S. PATENT DOCUMENTS

| | | | | |
|---|---|---|---|---|
| 3,656,317 A * | 4/1972 | Gray | .......................... | B64G 1/58 428/117 |
| 3,731,893 A * | 5/1973 | Stalmach, Jr. | ............ | B64C 1/38 102/517 |
| 3,908,936 A * | 9/1975 | Durran | .................... | B64G 1/50 244/171.7 |
| 4,671,348 A * | 6/1987 | Bauer | ...................... | B64C 3/36 165/44 |
| 4,924,228 A * | 5/1990 | Novak | ...................... | B64C 1/38 342/7 |
| 4,966,229 A * | 10/1990 | Senterfitt | ........... | F28D 15/0233 62/7 |
| 5,291,830 A * | 3/1994 | Zwan | ...................... | B64G 1/58 102/293 |
| 5,439,351 A * | 8/1995 | Artt | ........................ | F01D 5/185 415/114 |
| 5,484,122 A * | 1/1996 | DeSalve | ............... | B64D 13/00 244/134 B |
| 5,944,092 A * | 8/1999 | Van Oost | .............. | F28D 15/043 165/104.26 |
| 5,975,841 A * | 11/1999 | Lindemuth | ............ | F01D 5/181 415/114 |
| 6,227,288 B1 * | 5/2001 | Gluck | .................. | F28D 15/043 165/104.26 |
| 6,698,687 B2 * | 3/2004 | Daggett | ............... | B64C 23/005 244/57 |
| 6,810,946 B2 * | 11/2004 | Hoang | ................. | F28D 15/043 165/104.24 |
| 6,889,755 B2 * | 5/2005 | Zuo | ...................... | F28D 20/023 165/185 |
| 8,424,203 B2 * | 4/2013 | dos Santos e Lucato | ................... | F28F 13/003 29/890.039 |
| 8,844,877 B1 * | 9/2014 | Driemeyer | ................ | B64C 1/38 244/133 |
| 9,909,448 B2 * | 3/2018 | Gerstler | .................... | F01D 9/04 |
| 10,173,780 B2 * | 1/2019 | Mackin | ................. | B64D 15/06 |
| 11,260,953 B2 * | 3/2022 | Rathay | ................. | F28F 13/003 |
| 11,260,976 B2 * | 3/2022 | Gerstler | ................. | B64C 3/36 |
| 11,267,551 B2 * | 3/2022 | Sommerer | ............... | B64C 3/36 |
| 11,352,120 B2 * | 6/2022 | Rathay | ..................... | B64C 1/38 |
| 11,407,488 B2 * | 8/2022 | Rathay | ..................... | B64C 1/38 |
| 11,427,330 B2 * | 8/2022 | Rathay | ..................... | B64C 1/38 |
| 11,577,817 B2 * | 2/2023 | Hofer | ....................... | B64C 3/36 |
| 11,745,847 B2 * | 9/2023 | Rathay | ................. | B64C 1/0683 244/117 A |
| 11,768,016 B2 * | 9/2023 | Monazami | ............ | H10N 10/13 62/3.2 |
| 11,788,797 B2 * | 10/2023 | Haj-Hariri | ............ | F28F 13/187 165/185 |
| 2011/0031353 A1 * | 2/2011 | Stolte | .................... | B64C 15/04 244/134 B |
| 2011/0146956 A1 * | 6/2011 | Stroock | ................ | F28D 15/046 165/104.26 |
| 2012/0160445 A1 * | 6/2012 | Baumgardt | ........... | B64C 33/10 165/41 |
| 2014/0190162 A1 * | 7/2014 | Fonseca | ................ | B64D 15/02 60/273 |
| 2015/0040888 A1 * | 2/2015 | Zakhidov | ................ | C09K 5/10 126/618 |
| 2017/0107413 A1 * | 4/2017 | Wang | ................... | C09D 183/00 |
| 2018/0022439 A1 * | 1/2018 | Stanley | ................ | B64C 39/024 244/171.7 |
| 2018/0057191 A1 * | 3/2018 | Zhang | ................... | F42B 10/38 |

* cited by examiner

TWO-PHASE THERMAL PROTECTION OF THE HYPERSONIC LEADING EDGE

RELATED APPLICATIONS

This application claims the benefit of U.S. Provisional Application No. 62/514,393 filed Jun. 2, 2017, which is hereby incorporated herein by reference.

FIELD OF INVENTION

The present invention relates generally to hypersonic flight, and more particularly to thermal protection of hypersonic leading edges.

BACKGROUND

Hypersonics is the flight regime characterized by conditions in which high temperature and extreme heat flux dominate the flow physics. This regime spans high speed aircraft around Mach 5 through atmospheric entry of spacecraft at Mach 25 to 30. Stagnation temperatures frequently climb into the many thousands of degrees, well beyond the melt temperature of any known materials. Conventional thermal protection systems for the most extreme conditions employ ablative shielding, making use of latent heat for phase transition and gaseous advection to maintain vehicle airframe temperatures to within a manageable range for the short duration of entry. More recently, space planes and high-lift entry vehicles have enabled significantly lower heating by bleeding off airspeed at higher altitudes before descending into the dense lower atmosphere. These lower heat fluxes are managed with temperature resistant, extremely-low-thermal-conductivity heat shields during the transient entry process.

SUMMARY OF INVENTION

Disclosed herein are exemplary two-phase thermal protection systems, including conventional ablation, transpiration, internal spray cooling, thermosyphons and heat pipes, loop heat pipes, and solid-liquid phase change media. With heat transport demonstrated into the kilowatts per square centimeter, two-phase systems provide a promising class of reusable and continuous technologies for managing the extreme heat fluxes encountered by hypersonic vehicles. Exemplary systems can be designed with an understanding of thermal physics of two-phase system, vehicle dynamics, gravity/acceleration, and aerodynamics to determine preferred configurations and can be point-optimized or range-optimized for desired flight conditions. Exemplary heat transfer systems can be configured to conform to leading edge and vehicle planform with location-dependent optimization (leading to increased performance & decreased weight).

According to one aspect of the invention, a method of thermally protecting a leading edge of a hypersonic system includes the steps of transferring thermal energy from the leading edge into a phase change material (PCM); raising the temperature of the PCM to a phase-change temperature of the PCM; changing phase of the PCM; and carrying away heat from the leading edge via advection of the PCM.

Optionally, the method includes the step of forcing the PCM through a porous surface of the leading edge from a pressurized or capillary-driven storage container.

Optionally, the method includes the step of cooling the PCM and returning the PCM to the leading edge.

Optionally, the method includes the steps of: applying an impinging liquid PCM spray to an internal surface of a heat- and reaction-resistant aeroshell; and driving the PCM through a heat exchanger for condensation and re-application of the PCM in a continual process.

Optionally, the steps are performed via a thermosyphon.

Optionally, the thermosiphon is a heat pipe.

Optionally, the heat pipe is a loop heat pipe.

Optionally, the PCM is a metallic phase change media.

Optionally, the PCM is one of lithium, aluminum, or magnesium.

Optionally, the PCM is a solid-liquid PCM embedded directly behind the leading edge or placed within the main body to optimize the center of mass.

According to another aspect, a hypersonic system has a main body; a leading edge impinging into a fluid stream while in hypersonic operation; and a two-phase thermal protection system configured to cool the leading edge while in hypersonic operation via transfer of thermal energy from the leading edge into a phase change material (PCM), raising the temperature of the PCM to a phase-change temperature of the PCM, changing phase of the PCM, and carrying away heat from the leading edge via advection.

Optionally, the thermal protection system includes a porous surface of the leading edge through which the PCM is forced from a pressurized or capillary-driven storage container.

Optionally, the two-phase thermal protection system includes a closed loop system.

Optionally, the closed loop system includes a liquid sprayer configured to apply the PCM on to an internal surface of a heat- and reaction-resistant aeroshell of the hypersonic leading edge; and a heat exchanger for condensation and re-application of the PCM in a continual process.

Optionally, the closed loop system includes a thermosyphon.

Optionally, the thermosiphon is a heat pipe.

Optionally, the heat pipe is a loop heat pipe.

Optionally, the PCM is a metallic phase change media.

Optionally, the PCM is one of lithium, aluminum, or magnesium.

Optionally, the thermal protection system includes a solid-liquid PCM embedded directly behind the leading edge or placed within the main body to optimize the center of mass.

The foregoing and other features of the invention are hereinafter described in greater detail with reference to the accompanying drawings.

DETAILED DESCRIPTION

An overview of thermal management concepts employing phase change or two-phase working fluids for their potential in hypersonic leading edge cooling is given below. Two-phase heat transfer has an extremely high performance relative to solid conduction and high capability to sink heat into the enthalpy of phase change. The methods identified employing two-phase systems for consideration in hypersonic heat transfer include ablation, transpiration, closed-loop two-phase spray termed captive transpiration, thermosyphons and heat pipes, loop heat pipes, and solid-to-liquid phase change media.

The primary physical considerations in hypersonic flight pertain to thermal loads and chemical reactions. Ablation is a concept that addresses both of these issues by employing a sacrificial outer coating of a material with a high enthalpy of phase change for melting, vaporization, or sublimation. The impinging heat load is sunk into raising the temperature of the ablative shield, then changing phase, then is convected away by the gaseous phase of the ablated material. Much of the peak heating never reaches the shield surface itself, and the rapid removal of thermal energy prevents the underlying vehicle from heating beyond a design condition. Performance metrics for ablative materials include high enthalpy of phase transition, high heat capacity, low mass density, and low thermal conductivity. Combining phase change with advection, ablation provides an extremely high rate of thermal energy removal and prevents additional undesired surface reaction chemistry from degrading a hypersonic vehicle. Typical density of modern ablative coatings are roughly 510 $kg/m^3$ for the pure ablator and roughly 750 $kg/m^3$ when a water absorption sealant is applied. Approximately 54% of the pure ablator mass is subject to removal during ablation while maintaining the protected structure below a particular threshold temperature. While analysis of ablation thermal protections systems (TPS) cannot be reasonably addressed with energy storage or simple phase change calculations due to the flow field reactions and convection physics, various ablation kinetics models have demonstrated reasonable success when compared to empirical data. The most widely used is the 1999 "ZA model" proposed by Zhluktov and Abe, while more recent modifications such as Alba and Greenedyke promise increased accuracy by adjusting near-surface reaction rates based on surface temperatures.

While ablative shields have been successfully employed since the 1960s on atmospheric entry vehicles, the disadvantages include the effects of controllability and drag for a non-uniformly eroded surface, the effects on aerodynamics for ablative products entering the hypersonic flow, and the fact that ablation necessarily employs a consumable material, confining the method strictly to transient processes such as atmospheric entry where high drag and erosion are acceptable. Ablation also requires a minimum temperature for pyrolysis to occur; below this threshold temperature, the heat shield simply conducts thermal energy from the near-body flow field and into the vehicle, requiring application-specific design considerations to ensure that the airframe beneath the heat shield survives standard thermal conduction in the absence of pyrolysis.

Figure 1:
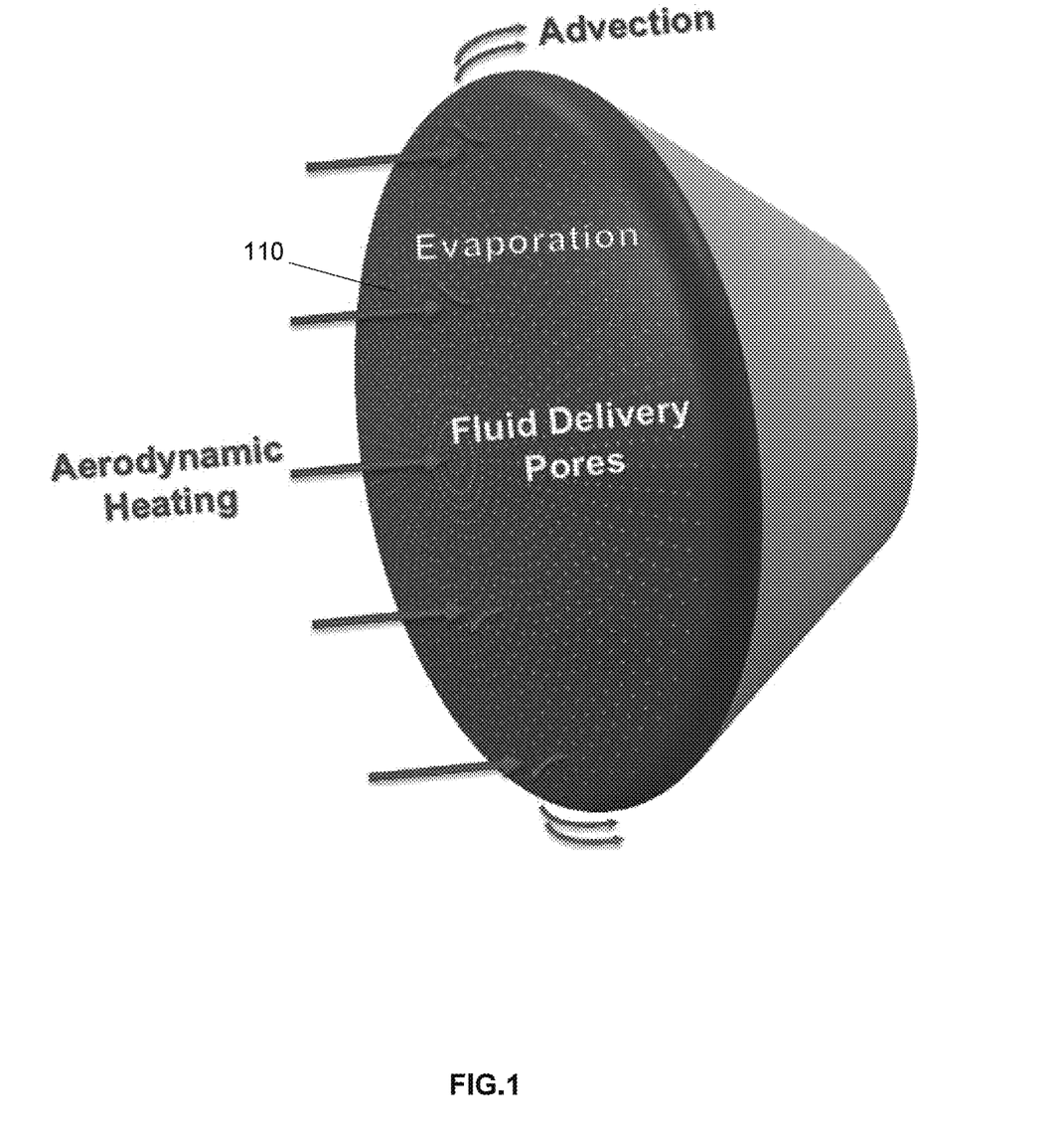
FIG. 1 shows an exemplary transpiration thermal protection system for an atmospheric entry capsule.

A variation on the concept of ablation is the secretion or application of a liquid phase thermal protection fluid for thermal energy removal by vaporization and advection, illustrated in FIG. 1. The liquid phase-change fluid may be secreted through a porous surface 110 from a pressurized or capillary-driven storage container. The liquid at the surface pore interfaces absorbs heat up to its local vaporization temperature and then sinks heat at this approximately constant temperature to change its phase. The evaporated vapor then advects the thermal energy away from the vehicle and continues to sink sensible heat as it leaves. There are several advantages of transpiration, primarily that the liquid is continually supplied to the heated surface, so no solid material erosion will affect aerodynamics or drag in the same way that ablation erosion does. Transpiration provides significant potential for thermal energy removal due to the high enthalpy of vaporization values of many candidate fluids and the addition of vapor to the hypersonic flow field, which both advects thermal energy away from the surface as well as provides a barrier between hot reacting gases and the vehicle in order to prevent or minimize surface reactions. Material properties of importance for transpired fluids include specific latent heat of vaporization, mass density, vapor pressure as a function of temperature, vapor density, viscosity of both the liquid and vapor phase, and thermal conductivity. For capillary-driven systems that rely on micro-channel pressure to replenish liquid to the pore interfaces, the liquid surface tension is also of importance.

The disadvantages of transpiration include the difficulty of integrating the liquid supply network to the heated surface, performance under high load factors, sloshing of liquid in storage tanks, and the complications to the aerodynamics of the addition of vapor to the near-body flow field. Additionally, since the concept necessarily requires a consumable fluid, the use of transpiration is restricted to transient processes such as atmospheric entry. The addition of a relatively cold vapor into the hot gas flow field will likely reduce the effective viscosity of the near-body flow field, which may result in complications in viscous heating and drag of an entry vehicle. And finally, the environmental effects of working fluids released into Earth atmosphere must be considered, likely restricting many practical uses to benign and inert candidates such as water. The total energy of a low-Earth orbit (LEO) object is on the order of 32 MJ/kg, compared to water's enthalpy of vaporization of 2.26 MJ/kg, suggesting that an atmospheric entry vehicle must be able to dissipate over 99% of its energy into heating of atmosphere or otherwise reject it in order to make water transpiration practical, under the assumption that the water storage is at most 10% of the entry vehicle mass.

While traditional transpiration implies the removal of the working fluid for heat rejection into the environment, much of the heating issues in hypersonic flight and atmospheric entry are confined to localized regions of peak heating, particularly for more streamlined geometries. A closed loop, "captive" system can be employed in which an impinging liquid spray is applied to the internal surface of a heat- and reaction-resistant aeroshell. The liquid droplets are pressurized to impact the heated surface, partially evaporate, and the two-phase mixture is driven back to a heat exchanger for condensation and re-application in a continual process. The active application of an impinging spray allows significant flexibility for a designer to select a fluid, nozzle size and shape, flow rate, and condenser heat exchanger for the particular geometry and heat flux to be managed.

Generally, the higher the applied heat flux under otherwise identical conditions, the higher the thermal gradient through the wall and the higher the inner wall superheat relative to the saturation temperature of the working fluid. Captive transpiration in the context of electronics cooling with impinging liquid spray has been demonstrated for low wall-fluid superheat (<100° C.) to obtain heat removal as high as 1200 W/cm$^2$ using water on various surface roughness conditions. While some studies report heat transfer coefficients in excess of 10 W/cm$^2$/K for heat fluxes in excess of 103 W/cm$^2$ for purposes of electronics cooling, a review of the state of the art suggests that there is not any active research in spray cooling in the temperature regime of 500 K or greater, of primary interest for hypersonics.

Figure 2:
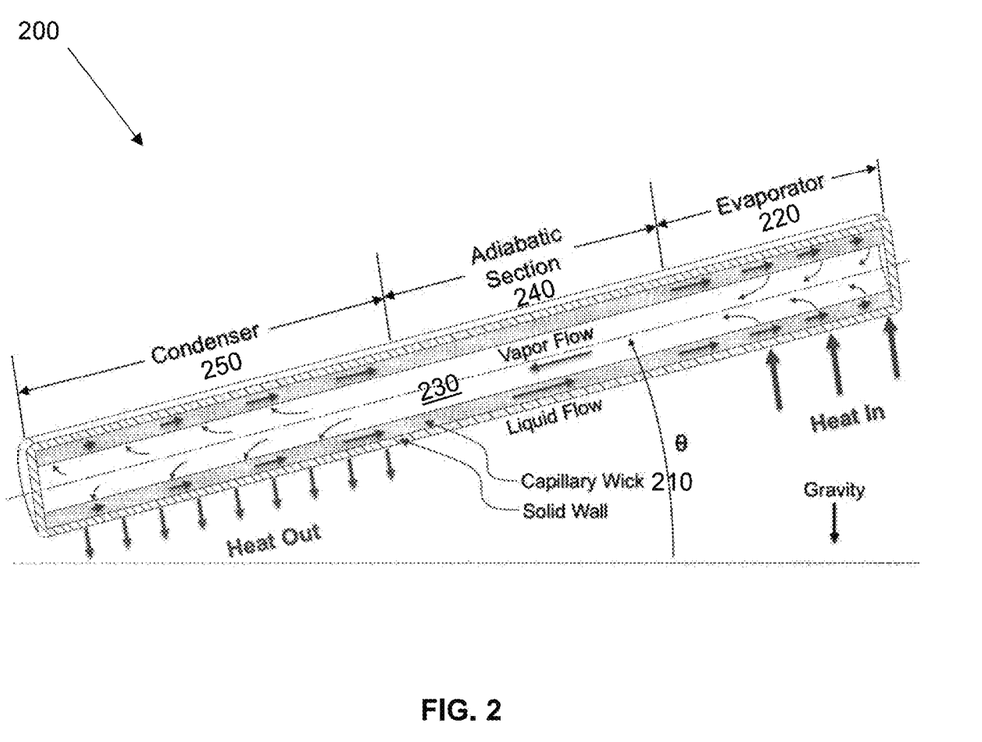
FIG. 2 shows a schematic of an exemplary heat pipe.

A thermosyphon is comprised of a working fluid in a sealed container, existing under its own pressure in both liquid and vapor phases. A heat pipe 200 is a thermosyphon which additionally includes a capillary structure 210 to provide a driving mechanism in order to operate adversely to or in the absence of gravity. Liquid is maintained at a heat source by gravity or a capillary wick, as illustrated in FIG. 2. Heat conducts via a thermal gradient through the evaporator section 220, through the wick and into the liquid. The liquid evaporates according to its enthalpy of vaporization, and the newly evaporated vapor advects through the hollow vapor core 230, past an adiabatic section 240 and into the condenser section 250. Heat conducts via thermal gradients from the vapor, condensing it, and into the capillary structure 210, through the condenser wall, and into the heat sink. The newly condensed liquid is then returned to the evaporator by either or both capillary forces and gravity. Various wick structures have been produced to accomplish the capillary structure, ranging from sintered powder to axial wall grooves to annular mesh and combinations thereof.

Figure 3:
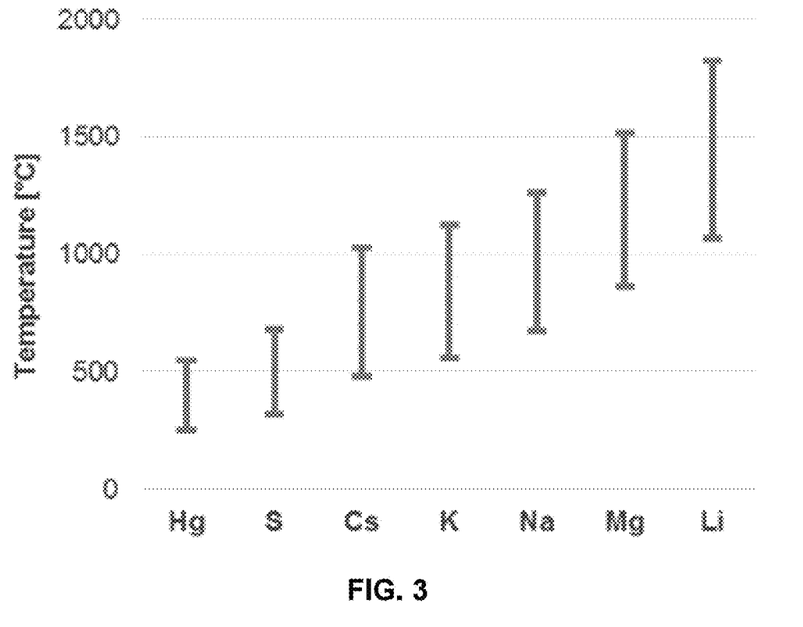
FIG. 3 shows exemplary working fluids for heat pipes in the temperature regimes of interest in hypersonics for use with non-ablative structural materials.
Figure 4:
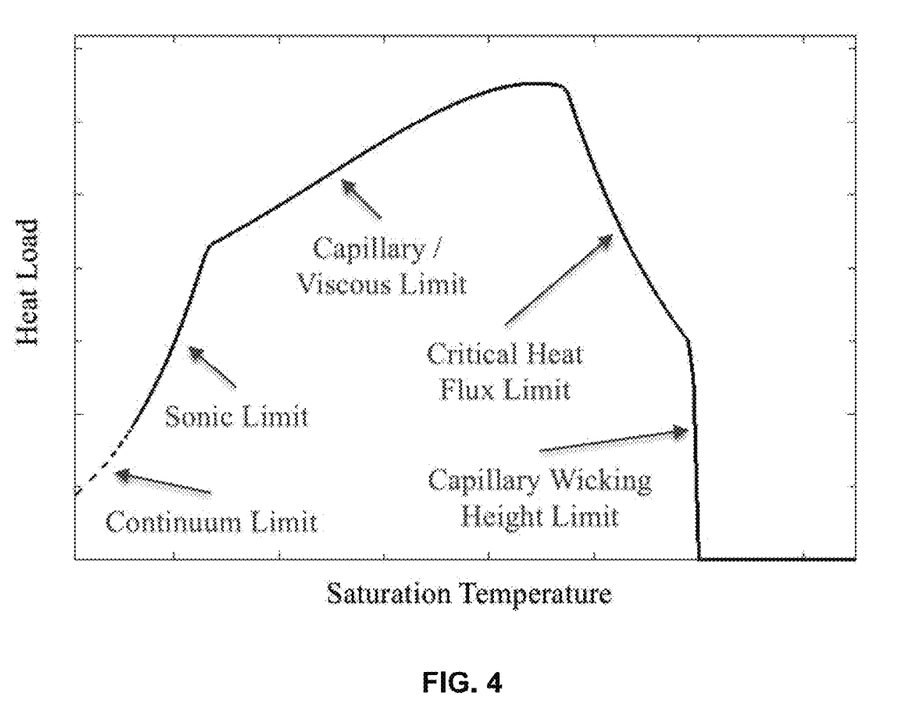
FIG. 4 shows typical heat pipe operating limits.

The heat pipe working fluid is selected based on advantageous physical properties and the operational temperature range. The physical properties of interest can be combined into a characteristic figure of merit for capillary-driven heat pipes, given by $$\Phi_{HP} = \frac{\rho_L \sigma \lambda}{\mu_L} \quad (1)$$

and for thermosyphons by $$\Phi_{TS} = \left(\frac{\rho_L^2 k^3 \lambda}{\mu_L}\right)^{1/4} \quad (2)$$

where $\rho_L$ is the liquid density, $\mu_L$ the liquid viscosity, $\sigma$ the surface tension, $\lambda$ the latent heat of vaporization, and k the thermal conductivity. The most critical aspect is the operational temperature range, which can be approximated by the saturation vapor pressure: taken as approximately 10 to 2,000 kPa (0.1 to 20 atm), the lower end typically limited by rarefied vapor flow rate at the continuum or sonic limit and on the upper end by a suggested maximum containment operating pressure. Candidate working fluids for heat pipes in the temperature regimes of interest in hypersonics for use with non-ablative structural materials are presented in FIG. 3 for the operational range of approximately 250-1750° C. saturation temperature. Challenges in these intermediate- and high-temperature regimes include internal and external casing corrosion and oxidation in atmosphere, transient start-up from frozen conditions, and designing to avoid the various typical operating limits depicted in FIG. 4, derived from a US Naval Research Laboratory heat pipe model and material properties from the National Institute of Standards and Technology.

An additional operating limit recently identified by Kasen of importance in hypersonics is the material thermomechanical yield limit, where excessive thermal gradient through the structural geometry results in mechanical stresses that exceed the temperature-dependent yield strength. Kasen summarizes this limit as a critical heat flux in the context of a cylindrically-blunted isothermal wedge leading edge heat pipe with constant wall thickness, $b_w$, as $$q_y = \frac{k_w \sigma_y (1-\nu)}{E\alpha} \left(\frac{1}{R_{LE} \ln\left(\frac{R_{LE}}{R_{LE} - b_w}\right)}\right) \quad (3)$$

Figure 5:
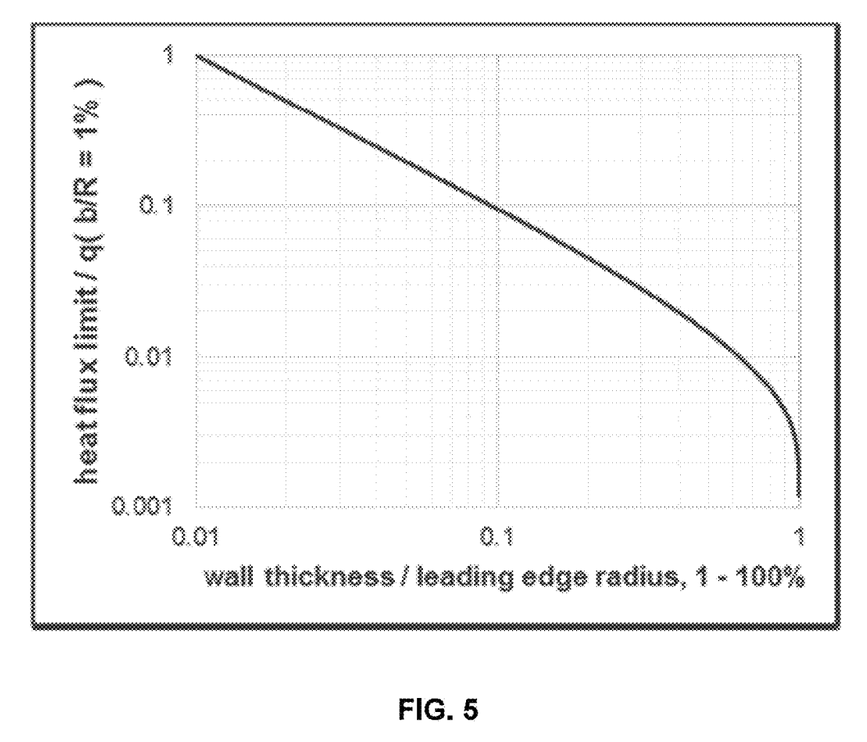
FIG. 5 shows thermomechanical yield limit ratio for various wall thickness ratios.

A key feature that is not necessarily intuitive is the adverse effect of thickening the casing wall in approaching this limit. Approximating constant material properties, this relationship is illustrated in FIG. 5 for how rapidly the limitation grows as normalized by a baseline heat flux for a 1% wall-to-leading-edge-radius thickness ratio. The tradeoff between relative wall thickness and heat flux limit is strongly logarithmic until the wall thickness reaches a similar order as the leading edge radius, beyond which the heat flux limit drops asymptotically. Qualitatively, this suggests that thinner structural casing walls are much more desirable for sharper leading edges and that the minimum leading edge radius will be dictated by the allowable minimum wall thickness for high-operating-pressure working fluids in order to avoid the thermomechanical yield limit.

Early investigations into leading edge heat pipes focused on heat transfer and working fluid performance at high temperatures while more recent attention has been paid to casing and structural materials and robustness for long duration operation at high temperatures. Analytical and numerical methods have been developed for transient startup and frozen startup conditions as well as the non-uniform heat flux and geometry associated with aerodynamics and aerothermal heating.

Heat pipes carry the primary disadvantage that the liquid returning to the evaporator must traverse a high-pressure-drop capillary wick structure. An alternative formulation is provided by the Loop Heat Pipe (LHP) 600, illustrated in FIG. 6, where an annular capillary structure 610 is saturated with liquid and the high-pressure-drop dimension is minimized with almost exclusively radial flow. The annular wick contacts the evaporator casing, allowing heat to conduct from the source to evaporate the working fluid. The smaller distance traveled by the working fluid through the porous material allows much smaller capillary channels, further enhancing capillary driving pressure. The small-pore primary wick is kept saturated by a larger-pore secondary wick which draws its liquid from a loop reservoir to ensure that the primary wick is always saturated.

Figure 6:
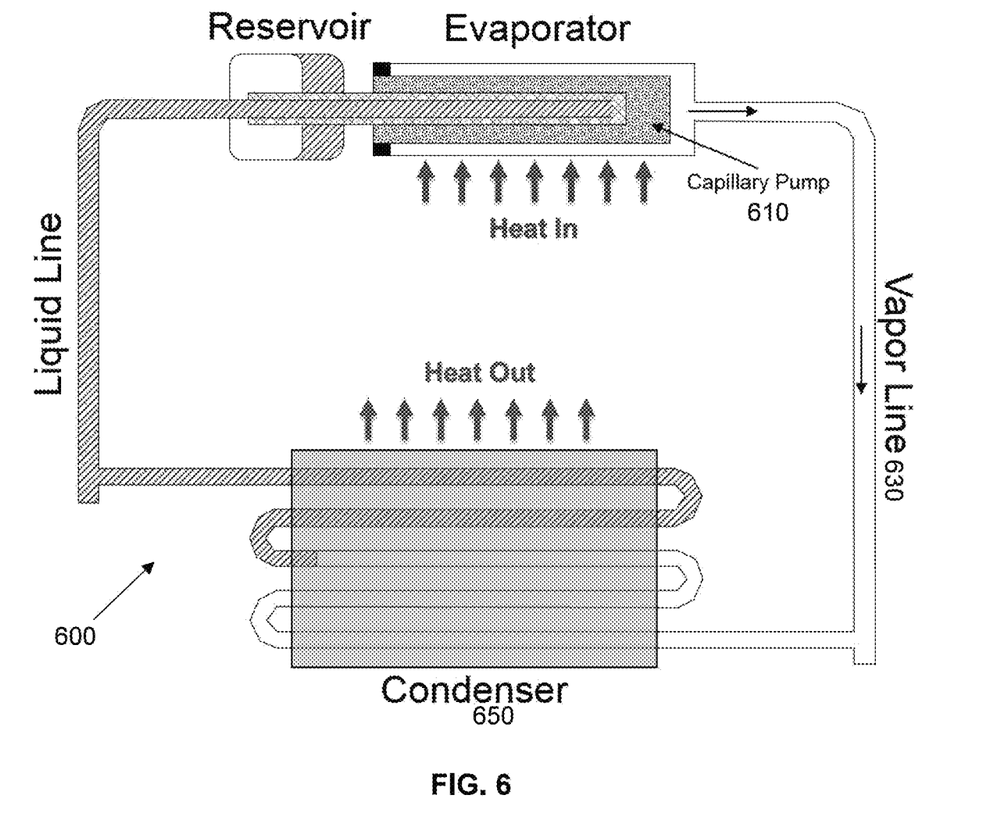
FIG. 6 shows an exemplary loop heat pipe schematic.

The vapor then travels down the evaporator vapor grooves external to the wick, during which the vapor is super-heated relative to its saturation temperature. The vapor travels down the (smooth) vapor line 630, with minimal pressure loss, and into the condenser section 650. The condenser plate conducts heat from the vapor, rejecting it to the heat sink and condensing the vapor into liquid. The liquid is further sub-cooled in the remainder of the condenser, and the sub-cooled liquid travels along the liquid line into the reservoir where it can be soaked up again by the secondary wick. The two primary advantages of LHPs over heat pipes are the higher capillary pressure enabled by the radial LHP flow versus the high-pressure-drop axial heat pipe liquid flow, and the smooth transport lines of the LHP that allow large transport distances for minimal pressure drop. The added complexity of the two-phase reservoir and localizing the vapor-liquid interface in the condenser with super-heating and sub-cooling provide for much more complex dynamics in LHPs than their simpler predecessors. Operation and predictive analysis become more difficult for start-up, transient operation, and steady state performance. Most notably, initial conditions with respect to vapor mass fraction and location exist such that start-up simply will not occur.

Additionally, oscillations have been observed as early as 1999 that have only been recently explained in the context of a stability analysis for a seven-component set of coupled differential equations that can numerically reproduce these oscillations. While empirical investigations are ongoing at the Naval Research Laboratory, it is thought that LHP "de-prime" failures on high-value orbital systems have root causes in these oscillational instabilities and open questions remain regarding the potential to stabilize and control LHPs. The advantage of LHPs are significantly higher heat transfer capability at larger physical scales and longer distances than the capability of standard heat pipes.

Solid-to-liquid phase change media has been extensively investigated in the range of 250-350K using mixtures ranging from water to waxes for their large latent heat of fusion values. The application of the concept in the temperature ranges of interest in hypersonics merits consideration of metallic phase change media. The advantage in the moderate and high temperature regime is that metals often have thermal conductivity values two to three orders of magnitude above that of room-temperature phase change media, allowing for significant improvement in minimizing thermal gradients. Physical properties of interest in phase change media include density, enthalpy of fusion, mass specific heat capacity, melt temperature, and thermal conductivity. A performance metric that may be used for comparison of capability between material candidates is the total energy required to melt 1 kg from an initial condition of 300K and then increase the liquid temperature to 1000K:

$$\frac{E_{300-1000K}}{m} = \int_{300}^{T_m} c_S(T)dT + \lambda_{fus} + \int_{T_m}^{1000} c_l(T)dT \quad (4)$$

A brief survey of pure elements with melt temperatures in the range of interest to hypersonics, keeping in mind that a temperature gradient is required to drive thermal energy flow into the phase change material (PCM) and the maximum desired structural wall temperature is on the order of 1000° C.; we identify lithium, aluminum, and magnesium as desirable candidates. Other materials considered perform significantly worse per unit mass than these. Note that while low density is generally preferred for aircraft and spacecraft metals, high density is preferred for PCMs in order to minimize storage volume and temperature gradients required to disperse the thermal energy into the PCM.

Disadvantages of solid-to-liquid PCMs for use in hypersonics include the challenges of volume expansion between phases and related structural complications, sloshing of the liquid phase, and the relatively low enthalpy of fusion compared to vaporization. Lithium, for example, sinks 45.3 times as much thermal energy into vaporizing a unit of mass than to melt it. And, finally, the PCM concept is inherently a transient process, lending its use only to atmospheric entry vehicles and finding application in only short duration processes. The total energy of a LEO object is on the order of 32 MJ/kg, suggesting that an atmospheric entry vehicle must be able to dissipate over 99% of its energy into heating of atmosphere or otherwise reject it in order to make any of the PCMs identified above practical for use, under the assumption that the PCM is at most 10% of the entry vehicle mass.

Each of the two-phase thermal protection systems discussed above have distinct advantages and disadvantages with respect to specific application, ease of integration, and duration of intended use. Integration is a nontrivial aspect of a component technology, and can be loosely categorized as either assembly or architectural integration. Assembly integration refers to a distinct component or subassembly that is introduced into the otherwise complete system as an additional feature or detail. The Space Shuttle Orbiter ablative heat tiles are an example of an assembly-integrated component technology. Architectural integration refers to designing the technology directly into the physical system architecture, which can be more mass-efficient but can require additional cost and effort in design and fabrication. The load-bearing propellant tanks of the Mercury Redstone and inflatable propellant tanks of the Atlas launch vehicles are examples of architectural integration of a component technology.

Figure 7:
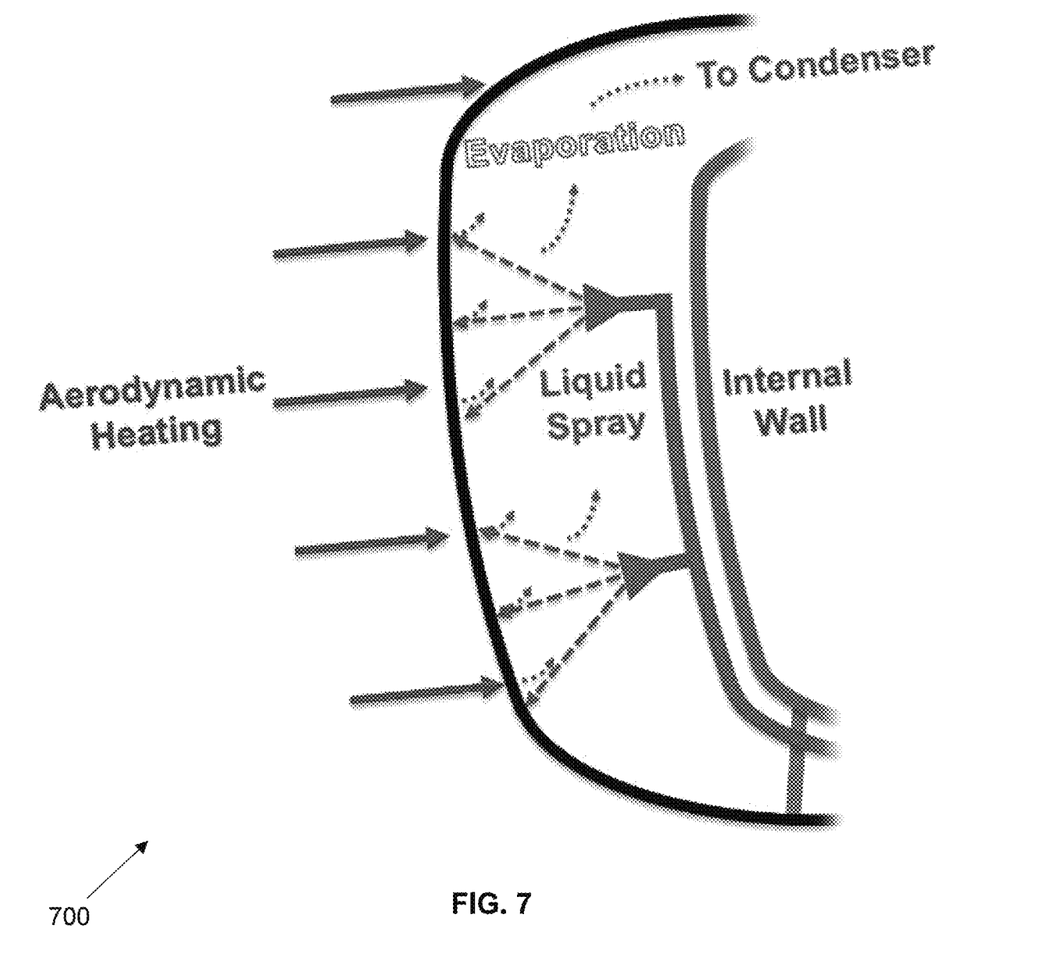
FIG. 7 shows an exemplary captive transpiration system schematic.

Ablation is typically assembly-integrated and is in regular successful use by modern entry vehicles in the high hypersonic transient regime, so we will forgo its discussion here. An external transpiration cooling system was depicted in FIG. 1 as architecturally integrated, with working fluid lines that are pressurized or driven by capillary pressure from a reservoir to the surface pores at the heated surface. An internal, captive transpiration system 700 is illustrated in FIG. 7. The working fluid is stored in a loop in both liquid and vapor phase. The liquid is driven through a compressor pump and sent as an impinging spray onto the internal surface of the exterior wall. The partially evaporated two-phase flow then returns to the condenser for heat removal, either rejected to the downstream external flow or stored in a transient medium, and the newly condensed liquid is pumped back into the liquid line.

Figure 8:
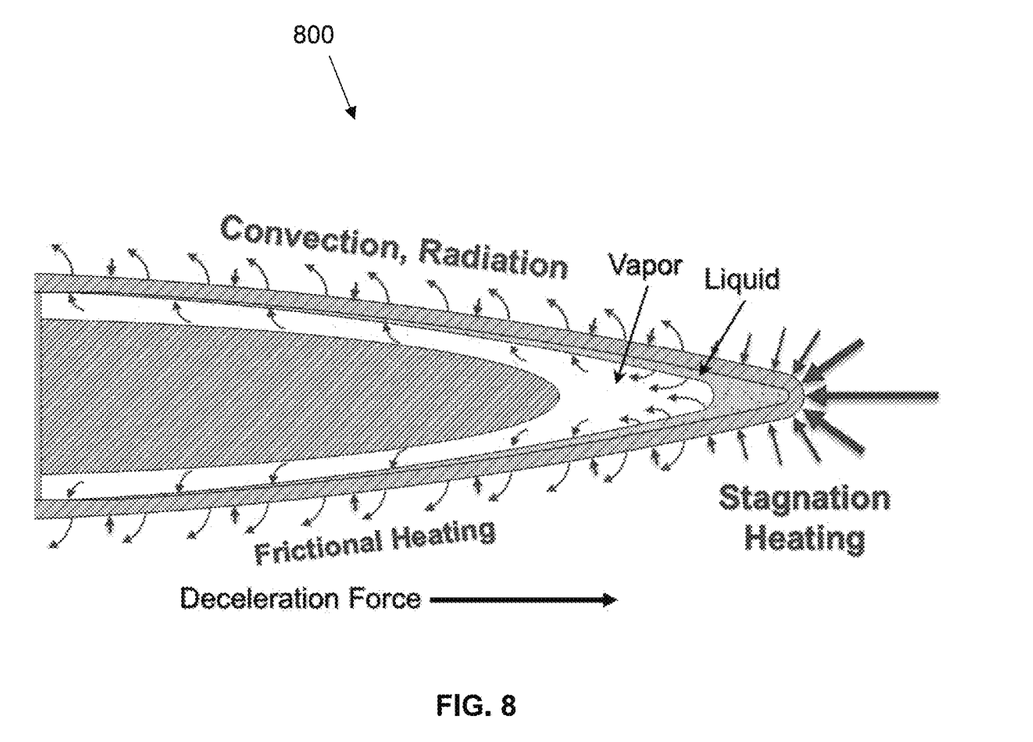
FIG. 8 shows an exemplary integrated deceleration-driven leading edge thermosiphon schematic.
Figure 9:
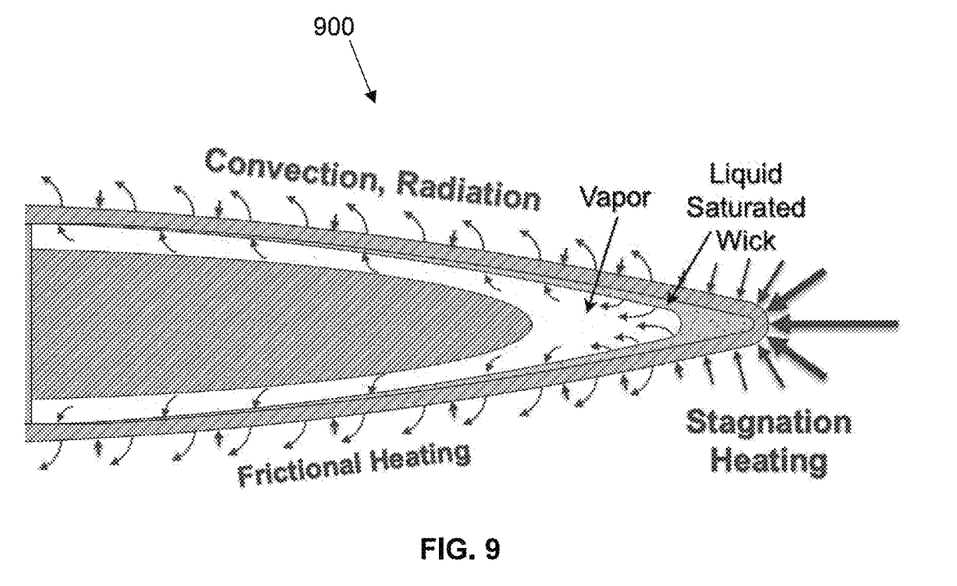
FIG. 9 shows an exemplary integrated leading edge heat pipe schematic.

Concept figures and schematics are presented in the figures that follow for thermosyphons, heat pipes, and loop heat pipes. Importantly, all of these figures depict thermal rejection downstream for steady state operation. However, the heat rejection could certainly be accomplished with an internal energy storage system for a transient process. For brevity, only the environmental rejection is depicted. A generic architecturally integrated leading edge deceleration-driven thermosiphon 800, as would be used for an entry vehicle, is depicted in FIG. 8. A corresponding leading edge heat pipe 900, driven by capillary forces provided by a wall-lining wick, is presented in FIG. 9. Both of these figures could apply to either a planar leading edge or an axisymmetric nose cone.

Figure 10:
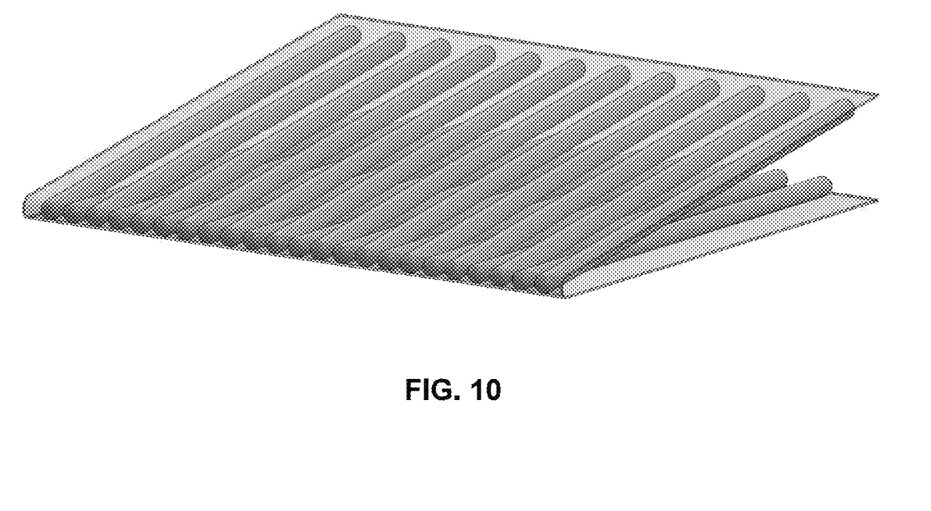
FIG. 10 shows an exemplary leading edge cylindrical heat pipe assembly.
Figure 11:
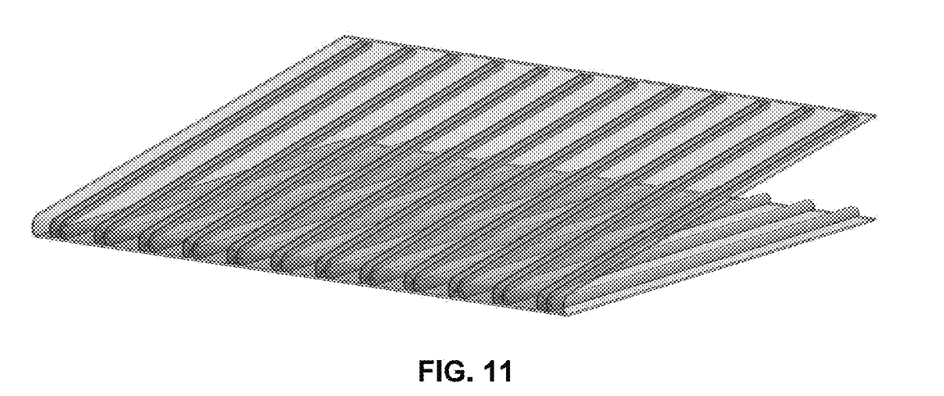
FIG. 11 shows an exemplary leading edge D-section bent panel assembly.

For assembly integration, standard cylindrical heat pipes may be installed into leading edges as illustrated in FIG. 10. An alternate concept that improves the conductance through the wall as well as the heat transfer area exposed to the working fluid is presented in FIG. 11. The "D-section" panel can be produced or bent into a wedge configuration and further enables heat transfer between the windward and leeward airfoil sides.

Figure 12:
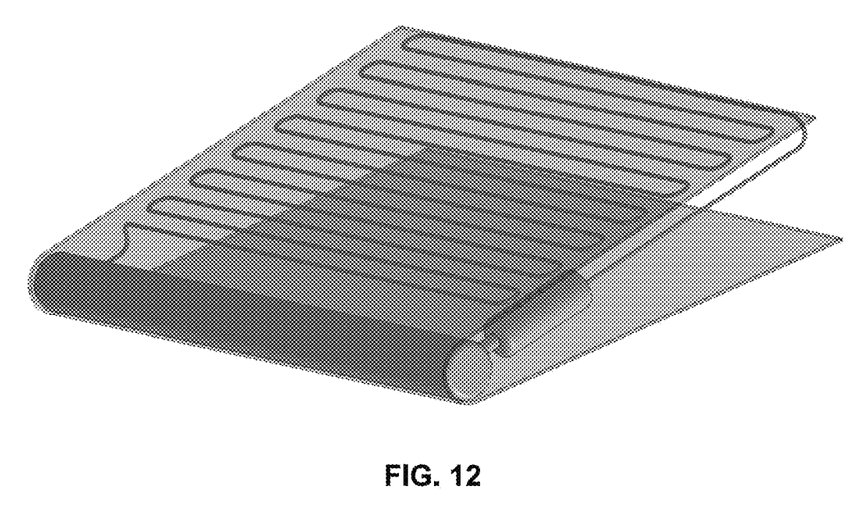
FIG. 12 shows an exemplary integrated leading edge loop heat pipe.

Loop heat pipes offer significant flexibility for design integration and lend themselves well to planar geometry, such as the leading edge wedge depicted in FIG. 12. The evaporator section can span a unit width of the airfoil and the fluid lines can be conveniently routed long distances with generous area coverage compared to heat pipes due to the advantage that loop heat pipes provide in minimal pressure drop. Importantly, one would design for the vapor line to exit the evaporator and then begin routing along the downstream airfoil direction close behind the leading edge, desiring a monotonically increasing distance from the leading edge so that the condenser line becomes progressively cooler. Upon termination from the external wall contact at the end of the condenser, the liquid return line should not maintain contact with the surface as it is routed back to the fluid reservoir in order to avoid evaporation in the liquid return line. Similarly, the reservoir should be thermally isolated from the external heat source in order to avoid inadvertent phase change. Further than the concept model presented in FIG. 12, parallel condenser lines could be implemented to route from the leading edge to both downstream surfaces, or from the windward surface and leading edge to the leeward surface. The leading edge radius must be designed for compatibility with heat transfer and mechanical dimensioning constraints for production and integration of the evaporator assembly.

A solid-liquid PCM can be integrated as a transient concept as either directly embedded behind the leading edge wall or placed within the vehicle volume to optimize the center of mass, for which the heat could be transferred using any of the above generic two-phase methods. Water's latent heat of vaporization, for reference, is 2.26 MJ/kg at one standard atmosphere. While there is an efficiency factor for vaporization in practice, a baseline minimum estimate of required mass flowrate for a Mach 6 waverider vehicle operating at 50 kPa, enduring a total heat load of 8.0 MW, is 3.5 kg/s in steady state. While this is not practical for a consumable method such as transpiration for any moderate duration, the flowrate is certainly feasible for captive transpiration for rejection back to the environment.

For the last six decades, thermal energy flow has been minimized with temperature-resistant low-conductivity heat shields, driving up peak leading edge temperatures, or convected away from the vehicle using ablative thermal protection systems. The success of ablative systems merits further consideration of energy removal concepts, with particular attention toward multi-phase systems that employ the phenomenal transport and storage characteristics of phase change and convection. Various two-phase concepts have been presented for thermal energy removal with optional storage in the present work, with a preceding discussion of temperature and heating conditions encountered by steady hypersonic cruise and transient atmospheric entry vehicles. Ablation has been acknowledged as the leading present technology for transient entry heating, with transpiration and solid-to-liquid phase change as low-probability alternatives given the success of ablative systems. If engineered in detail under the constraints provided, water transpiration suggests a desirable replacement for ablation given its reusability with replenishment, low cost, predictable aerodynamic effects, advantages for minimizing surface chemistry, and environmental insouciance.

Thermosyphons are identified as easily integrated deceleration-driven thermal energy removal systems, either paired with a PCM for transient operation or thermally connected downstream for environmental heat rejection for longer duration operation. Heat pipes carry the advantage of being capillary force-driven, also aided by favorable deceleration during atmospheric entry, avoid the issue of liquid sloshing, and can similarly be paired with a PCM or configured to reject to the environment. Configuration flexibility and scalability are major strengths of head pipes, as is the potential for assembly component integration or complete architectural integration. And, finally, loop heat pipes provide significant advantages for thermal transport across larger distances than heat pipes and can typically offer much higher capillary pumping pressure, but are best suited for planar symmetry.

Advents in additive manufacturing will have tremendous implications for the architectural integration and performance capability of two-phase systems, particularly for porous wicks fully integrated into the outer casing structure. More efficient mass, volume, and parts-count integration of two-phase technologies and the aeroshell will provide better heat transfer with lower thermal gradients than have been presently realized.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of thermally protecting a leading edge of a hypersonic system, the method including the steps of:
    saturating an annular primary wick in contact with a casing of an evaporator and having a first pore size with a phase change material by means of an annularly-inward secondary wick having a second pore size and being coupled to a liquid line, the second pore size being larger than the first pore size, wherein a first end of the secondary wick extends into a reservoir and a second end of the secondary wick extends into the evaporator, the second end of the secondary wick having a terminal end;
    terminating the liquid line inside of the evaporator (i) inside of the second end of the secondary wick and (ii) before the terminal end of the second end of the secondary wick such that the terminal end of the second end of the secondary wick extends around a terminating end of the liquid line;
    transferring thermal energy from the leading edge into the phase change material through the casing;
    raising the temperature of the phase change material to a phase-change temperature of the phase change material;
    changing phase of the phase change material; and carrying away heat from the leading edge via advection of the phase change material.

2. The method of claim 1, further comprising the step of cooling the phase change material and returning the phase change material to the leading edge.

3. The method of claim 2, wherein the phase change material is a metallic phase change media.

4. The method of claim 3, wherein the phase change material is one of lithium, aluminum, or magnesium.

5. The method of claim 1, wherein the steps are performed via a thermosyphon.

6. The method of claim 5, wherein the thermosyphon is a heat pipe.

7. The method of claim 6, wherein the heat pipe is a loop heat pipe.

8. The method of claim 1, wherein the phase change material is a solid-liquid phase change material embedded directly behind the leading edge or placed within a main body to optimize the center of mass.

\* \* \* \* \*